United States Patent [19]
Rauter et al.

[11] Patent Number: 5,129,474
[45] Date of Patent: Jul. 14, 1992

[54] STEERABLE WHEEL AXLE FOR A MOTOR VEHICLE

[75] Inventors: Jürgen Rauter; Ünal Gazyakan, both of Friedrichshafen; Josef Haupt, Tettnang; Rainer Bürker, Ravensburg, all of Fed. Rep. of Germany

[73] Assignee: Zahnradfabrik Friedrichshafen AG, Friedrichshafen, Fed. Rep. of Germany

[21] Appl. No.: 573,044
[22] PCT Filed: Mar. 8, 1989
[86] PCT No.: PCT/EP89/00239
§ 371 Date: Aug. 29, 1990
§ 102(e) Date: Aug. 29, 1990
[87] PCT Pub. No.: WO89/08576
PCT Pub. Date: Sep. 21, 1989

[30] Foreign Application Priority Data

Mar. 12, 1988 [DE] Fed. Rep. of Germany ....... 3808386

[51] Int. Cl.⁵ .............................................. B62D 5/06
[52] U.S. Cl. ...................................... 180/156; 180/132; 180/158; 180/234
[58] Field of Search ............... 180/155, 156, 158, 905, 180/132, 154, 151, 234, 240, 264, 267; 280/91, 773, 95.1

[56] References Cited

U.S. PATENT DOCUMENTS

| | | | |
|---|---|---|---|
| 1,361,047 | 12/1920 | Gregory et al. | 180/905 |
| 2,086,814 | 7/1937 | McCollum | 280/773 |
| 2,709,495 | 5/1955 | Vickers | 180/156 |
| 4,102,427 | 7/1978 | Sabec | 180/156 |
| 4,319,654 | 3/1982 | Ujita | 180/155 |

FOREIGN PATENT DOCUMENTS

| | | | |
|---|---|---|---|
| 1655927 | 7/1979 | Fed. Rep. of Germany. | |
| 3414579 | 12/1985 | Fed. Rep. of Germany. | |
| 8200983 | 4/1982 | World Int. Prop. O. | |
| 8807953 | 10/1988 | World Int. Prop. O. | 180/151 |
| 9005083 | 5/1990 | World Int. Prop. O. | 180/158 |

Primary Examiner—Mitchell J. Hill
Assistant Examiner—Anne Marie Boehler
Attorney, Agent, or Firm—Herbert Dubno

[57] ABSTRACT

In a steerable wheel axle for a motor vehicle with a rigid axle body which includes a hydrostatic or servo-assisted steering device that is incorporated in the axle body, the steering cylinder is arranged coaxially with the longitudinal median axis of the axle body and in driving connection with a swivelling lever radially projecting from axle body and linked to steering tie rods.

11 Claims, 1 Drawing Sheet

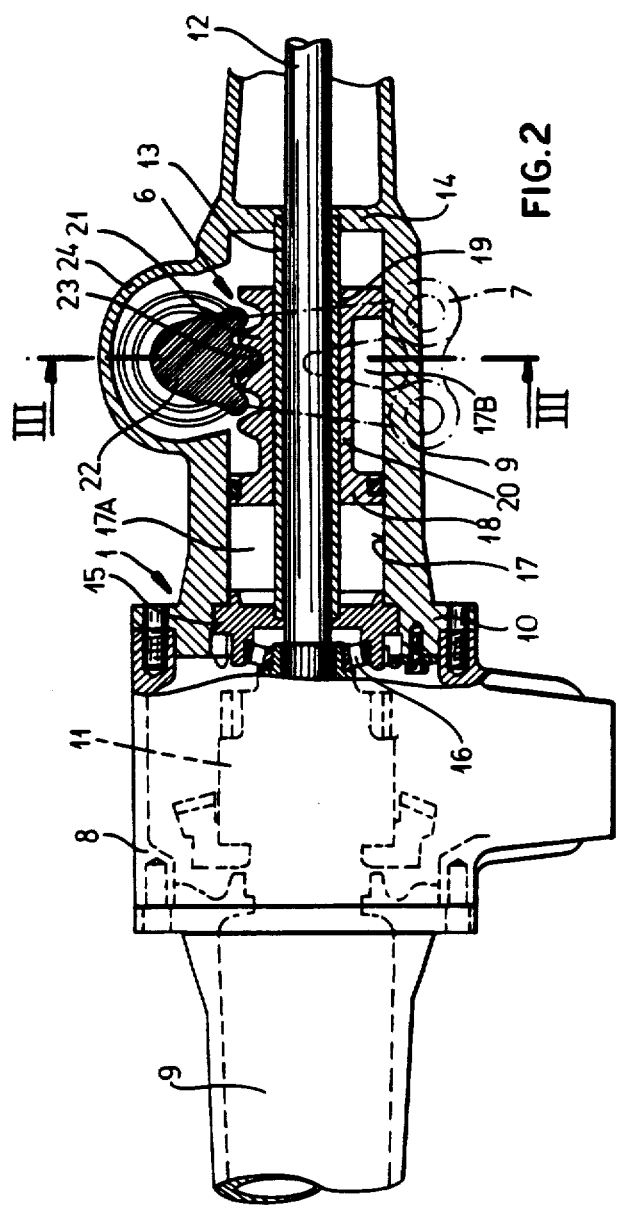
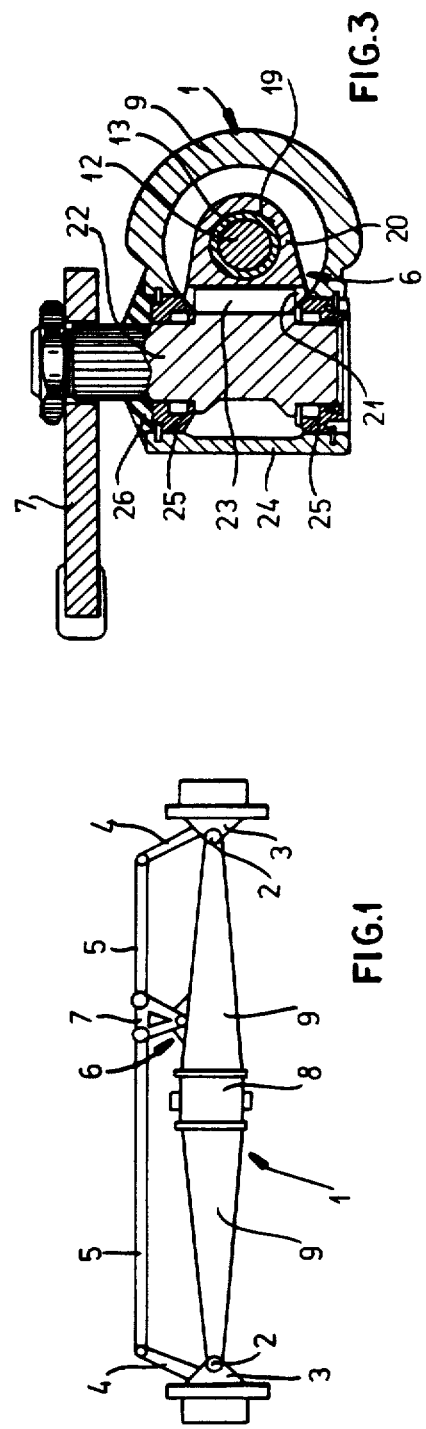
FIG.2
FIG.3
FIG.1

STEERABLE WHEEL AXLE FOR A MOTOR VEHICLE

CROSS REFERENCE TO RELATED APPLICATION

This application is a national phase application of PCT/EP89/00239 filed Mar. 8, 1989 which in turn is based upon German national application P 38 08 386.8 filed Mar. 12, 1988.

FIELD OF THE INVENTION

Our present invention relates to a steerable wheel axle for a motor vehicle. More particularly, the invention relates to an axle whose rigid axle body has at its ends steering knuckles receiving wheel heads which are pivotable by means of steering arms; the steering arms are connected via steering tie rods with a hydrostatic or servo-assisted steering system located within the axle body and having a working piston slidable in the direction of the longitudinal axis in a preferably double-action steering cylinder.

BACKGROUND OF THE INVENTION

A steerable wheel axle of the mentioned kind is known from WO-A 82/00983. There, a nondriven wheel axle for a fork lift is described, whose rigid axle body is pivotably suspended on the chassis. Considered with respect to a vertical, longitudinal median plane of the wheel axle, the axle body has an asymmetric shape, meaning that it has a convexity on one side. Inside this protruding portion, the axle body comprises a steering device, wherein a steering cylinder is arranged parallel to the longitudinal median axis of the wheel axle and receives a working piston. This cylinder is articulately connected at each of its ends via short steering tie rod segments with the steering arms of both wheels. This integration of the steering system in the axle body has the disadvantage of increased overall dimensions of the axle body and thus a weight increase of the wheel axle. The higher weight has an unfavorable effect on the overall construction of the vehicle and, when the wheel axle is provided with spring action, it has a negative influence on its dynamics during travel. Problems arise also from the steering kinematics of this system, since the short steering tie rods segments arranged between the steering arms and the ends of the working piston can lead to expanded positions of the articulatedly connected elements and to considerable steering angle errors.

Finally, it is not possible to develop a wheel axle built this way into a driven steering axle with a differential and with a driving shaft leading from this differential to the wheels, since, at least in the construction of the prior art, the steering system occupies the space required for the axle drive.

DE-AS 16 55 927 describes a servo-assisted steering device for a steerable wheel axle in which a push-rod system from a steering gear leads to the steering arm of a steering knuckle. The steering arms assigned to the two steering knuckles are connected via a continuous tie rod and power-assisted by hydraulic servocylinders. The arrangement of the servocylinders in the travel direction of the vehicle requires a lot of room and there is danger of damaging the servocylinders.

OBJECTS OF THE INVENTION

It is the principal object of the invention to arrange a hydrostatic or servo-assisted steering system on a rigid axle body having acceptable weight and the overall dimensions of the wheel axle. Still another object is to provide an improved steering device so that it is protected against damage.

SUMMARY OF THE INVENTION

These objects are attained with a steerable wheel axle of the aforementioned kind according to the invention in that the steering cylinder is arranged coaxially with the longitudinal median axis of the axle body and the working piston cooperates with a rocking lever radially projecting from the axle body and linked to the steering tie rods and has a swivel axis running transversally with respect to the longitudinal median axis of the wheel axle. In this way, the steering system is integrated in the load-bearing structure of the axle body and requires no additional space. Considerable weight and cost advantages are achieved and the driving components of the steering system are very effectively protected against damage, without any additional structure provided for this purpose. The steering unit fully integrated in the axle body consisting of steering cylinder and working piston can be a component of either a hydrostatic steering system or of a servo-assisted steering system.

In a hydrostatic steering system, the working piston transmits the entire steering force via the rocking lever to the steering tie rods, while in a servo-assisted steering unit, a mechanical transmission element can act upon the rocking lever from a steering gear and servo assistance is provided from the working piston to the rocking lever.

A portion of the working piston can be formed as a toothed rack, meshing with toothed segment connected with the pivot lever via a steering shaft. In this way, the toothed rack simply sets the steering shaft into rotation, which makes the swivelling lever pivot. Since the driving elements, toothed rack and toothed segment, are protected inside the axle body, there is no danger that these elements will be damaged or become dirty.

Preferably, the toothed-rack portion of the piston rod can have a smaller radial dimension than the working piston, whereby this portion can be a segment, so that it is possible to shorten the distance between the axes of the steering shaft and the working piston. Further, the steering shaft can be arranged in a bearing eye made in one piece with the axle body. Such an incorporation of the arrangement consisting of the toothed segment, steering shaft and swivelling lever can be fabricated in one piece with the axle body, without any problems from the point of view of casting techniques.

A driven wheel axle can be provided with a differential connected via driving shafts to the wheel drive sets of the wheel heads, one of the driving shafts which is arranged inside the axle body being passed through a longitudinal bore of the working piston. In this way, it is possible not only to achieve a compact construction of the load-bearing axle body and the steering device, but in addition thereto, to incorporate into the system also the driving elements of the driven wheel axle. It is possible to arrange the longitudinal bore coaxially with the piston axis, so that the driving shaft passes centrally through the working piston.

An advantageous sealing of the working spaces of the steering cylinder is achieved, due to the fact that the working piston is guided in a sealed manner at its longitudinal bore on an inner pipe surrounding the driving shaft. On this inner pipe fastened in the axle body it is possible to insure sufficient sealing of the working spaces of the steering cylinder during the entire stroke of the working piston. In a further aspect of the invention, the axle body can consist of a differential housing with at least one axial pipe flanged thereto, whereby the inner pipe is kept in a fixed position with respect to the axial pipe or the differential housing by an intermediate flange at its end next to the differential housing and by a support web of the axial pipe at its end facing away from the differential housing. In this way, favorable assembly and disassembly conditions are created for the steering system. The inner pipe and the working piston can be easily inserted into the axial pipe flanged to the housing of the differential. Besides fixing the position of the inner pipe, the support web and the intermediate flange serve also as covers of the two working spaces of the steering cylinder. The intermediate flange can also serve for the support of the differential gear and/or of the driving shaft. In this way, the intermediate flange advantageously fulfills three functions at the same time.

BRIEF DESCRIPTION OF THE DRAWINGS

The above and other objects, features and advantages of my invention will become more readily apparent from the following description, reference being made to the accompanying highly diagrammatic drawing in which:

FIG. 1 is a top view of a wheel axle according to the invention with a steering system incorporated in the axle body showing the general construction of the wheel axle and its steering kinematics;

FIG. 2 is an elevational view of a wheel axle according to the invention, with a partial longitudinal section through an axial pipe and a steering system arranged therein; and FIG. 3 is a cross section taken along line III—III in FIG. 2 through the axial pipe and the steering device.

SPECIFIC DESCRIPTION

In FIG. 1, a rigid axle body of a steerable wheel axle has steering knuckles 2 arranged at its ends to receive pivotable wheel heads 3. To these wheel heads 3, tires of a vehicle which are not shown in the drawing are fastened. The swivelling of each of the wheel heads 3 is effected by a steering device 6, of which in FIG. 1 only the swivelling lever 7 is shown, via steering arms 4 and tie rods 5. The axle body 1 consists of three parts, i.e. a centrally placed differential housing 8 and axial pipes 9.

FIG. 2 shows a partial longitudinal section through one of the axial pipes 9 and the differential housing 8, as well as the steering device 6. It can be seen that the axial pipe 9 is connected with the differential housing 8 via a flange 10. Inside the differential housing 8, a differential gear 11 is mounted, which is driven from the transmission of the vehicle through a primary driving shaft, not shown in the drawing. From the differential gear 11, driving shafts 12 lead to each of the wheel heads 3 of the wheel axle. There, they drive the wheel sets (not shown in the drawing) either directly, or via reduction gears.

The driving shaft 12 is surrounded by an inner pipe 13 in the area where the steering system 6 is mounted to the axial pipe 9, this inner pipe being fastened at one of its ends in a support web 14 of the axial pipe 9 and at its other end in an intermediate flange 15. The intermediate flange 15 serves at the same time as a support for the differential 11, by means of a roller bearing 16.

The steering device has a steering cylinder 17, which is formed directly by the machined cylindrical inner wall of the axial pipe 9. In this steering cylinder 17, a working piston 18 is slidably guided, thereby forming working spaces 17A and 17B inside the steering cylinder 17. Further, the working piston has a coaxially running longitudinal bore 19, through which passes the inner pipe 13 together with the driving shaft 12. To the working piston 18 a piston rod 20 is attached, which over a certain portion is a toothed rack 21. A toothed segment connected to a steering shaft 22 meshes with the toothed rack 21. Due to the meshing of the teeth, a longitudinal displacement of the working piston 18 within the steering cylinder 17 causes a swivelling of the toothed segment 23 and thereby a rotational movement of the steering shaft 22.

As can be seen particularly from FIG. 3, the steering shaft 22, running transversally to the driving shaft 12 and the working piston 18, is rotatably mounted via bearing brackets 25 in a bearing eye 24, which is made in one piece with the axial pipe 9. An upper bearing bracket 25 is thereby covered with a dust lid 26, which is supposed to prevent the penetration of dirt inside the bearing eye 24. At its end extending from the bearing eye, the steering shaft 22 receives the swivelling lever 7, already shown in FIG. 1 and linked at its end with the tie rods 5, which in turn are linked to the steering arms 4 of the wheel heads 3.

As can be seen from FIGS. 2 and 3, the steering system 6 is fully integrated in the axle body 1, so that effective protection against dirt and damage to the steering device 6 and reduced overall dimensions of the steering axle can be achieved. A separate steering cylinder can be eliminated by using the axial pipe 9 as the steering cylinder 17. Furthermore, the integration of the steering system 6 in the axle body 1 can be applied to all steerable wheel axles with a rigid axle body 1, whereby steering angle corrections and adjustments can be made by means of the swivelling lever 7. In the embodiment of the invention shown in FIGS. 2 and 3, the bearing eye 24 is made in one piece with the axial pipe 9, but this bearing eye 24 can also be a separate element which is screwed to the axial pipe 9, whereby in an arrangement of identically built axial pipes 9 on both parts of the differential housing, a corresponding opening of the axial pipe without the steering system can be closed. In this way, a multiple use of identical components becomes possible, with the result of even further cost reduction.

REFERENCE NUMERALS

1—Axle body
2—steering knuckle
3—wheel heads
4—steering arm
5—tie rods
6—steering system
7—swivelling lever
8—differential housing
9—axial pipe
10—flange
11—differential gear
12—driving shaft
13—inner pipe
14—support web
15—intermediate flange 16—roller bearing
17—steering cylinder
17A—working space
17B—working space
18—working piston
19—longitudinal bore
20—piston rod
21—toothed rack
22—steering shaft
23—toothed segment
24—bearing eye
25—bearing bracket
26—dust lid

We claim:

1. A steerable wheel axle for a motor vehicle, said wheel axle comprising:
   an elongated rigid axle body formed with opposite ends;
   a pair of opposite steering knuckles mounted pivotally at respective ends of said axle body;
   a pair of opposite wheel heads mounted pivotally on the respective steering knuckles;
   a differential mounted between said opposite ends in said axle body;
   a pair of axle shafts rotatable about an axis in said body and operatively connected with said differential, said axle shafts extending oppositely toward the respective ends of said axle body and being connected with the respective wheel heads;
   a piston-cylinder assembly in said body for steering said wheel heads, said assembly comprising:
      a steering cylinder formed in said body and having a longitudinal bore coaxial with and receiving one of said axis shafts extending through said cylinder, and
      a working piston slidable axially in said cylinder and surrounding said one of said shafts; and
   lever means for transforming an axial movement of said working piston into a pivotal movement of said wheel heads and including:
      a swivelling lever projecting transversely of said axle body and having a swivel axis transverse to said axis, said swivelling lever being operatively connected with said working piston, respective steering arms connected to said wheel heads, and
      tie rods connected pivotally to the respective steering arms and to said lever.

2. The steerable wheel axle defined in claim 1 wherein said piston-cylinder assembly is a hydrostatic steering device.

3. The steerable wheel axle defined in claim 1 wherein said piston-cylinder assembly is a servo-assisted steering device.

4. The steerable wheel axle defined in claim 1 wherein said lever means comprises a steering shaft mounted in said axle body and formed with a toothed segment and rotatable about said swivel axis, said working piston being formed with a shank extending parallel to said one shaft and being spaced radially inward from said cylinder for forming a first working space of said cylinder, said shank having a longitudinal toothed rack portion meshing with said toothed segment, said steering shaft being rigidly connected with said lever.

5. The steerable wheel axle defined in claim 4, wherein said body including a pipe coaxial with said one shaft and extending from said differential mechanism, said working cylinder being formed by said pipe.

6. The steerable wheel axle defined in claim 5 wherein said differential includes a differential housing, said pipe being formed with an end provided with a flange operatively connected with said differential housing.

7. The steerable wheel axle defined in claim 6 wherein said flange is supported on a roller bearing mounted on said differential housing.

8. The steerable wheel axle defined in claim 4 wherein said flange and the working piston form a second working space of said cylinder in said axle body.

9. Steerable wheel axle according to claim 4, characterized in that at least the toothed rack portion (21) of the shank has a smaller radial dimension than the working piston (18).

10. Steerable wheel axle according to claim 2, characterized in that the steering shaft (22) is arranged in a bearing eye (24) which is made in one piece with the axle body (1).

11. Steerable wheel axle according to claim 1, characterized in that the longitudinal bore (19) runs coaxially with the axis of the working piston (18).

* * * * *